United States Patent
Warfield et al.

(10) Patent No.: US 10,637,778 B1
(45) Date of Patent: Apr. 28, 2020

(54) SYSTEMS, METHODS AND DEVICES FOR SCALABLE EXPANSION OF RULES-BASED FORWARDING PATHS IN NETWORK COMMUNICATIONS DEVICES FOR DISTRIBUTED COMPUTING SYSTEMS

(71) Applicant: OPEN INVENTION NETWORK LLC, Durham, NC (US)

(72) Inventors: Andrew Warfield, Vancouver (CA); Geoffrey Lefebvre, Montreal (CA)

(73) Assignee: OPEN INVENTION NETWORK LLC, Durham, NC (US)

( * ) Notice: Subject to any disclaimer, the term of this patent is extended or adjusted under 35 U.S.C. 154(b) by 84 days.

(21) Appl. No.: 16/054,016

(22) Filed: Aug. 3, 2018

Related U.S. Application Data

(60) Provisional application No. 62/542,994, filed on Aug. 9, 2017.

(51) Int. Cl.
*H04L 12/741* (2013.01)
*H04L 12/721* (2013.01)
*H04L 12/713* (2013.01)
*H04L 12/935* (2013.01)
*H04L 12/24* (2006.01)
*H04L 12/715* (2013.01)

(52) U.S. Cl.
CPC ........ *H04L 45/745* (2013.01); *H04L 41/0803* (2013.01); *H04L 45/38* (2013.01); *H04L 45/64* (2013.01); *H04L 49/3009* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,151,324 A | * | 11/2000 | Belser | H04L 12/4608 370/355 |
| 2006/0184694 A1 | * | 8/2006 | Monette | H04L 12/18 709/246 |
| 2008/0183889 A1 | * | 7/2008 | Andreev | H04L 29/06 709/238 |
| 2015/0281130 A1 | * | 10/2015 | Lembcke | H04L 49/351 370/276 |

* cited by examiner

*Primary Examiner* — Maharishi V Khirodhar
*Assistant Examiner* — Kenneth P Hunt

(57) ABSTRACT

The present disclosure relates to distributed computing systems, and methods and devices relating thereto, said systems comprising a plurality of distributed computing hosts that process client requests from a computing client; and a programmable network switch, comprising two or more network ports for communicatively interfacing said plurality of distributed computing hosts and said computing client, said programmable network switch operable to forward client requests to a given network port based on forwarding rules related to client source addresses; wherein the programmable network switch replaces a request destination address with an incoming network port indicator that identifies on which network port a given client request is received; and wherein the programmable network switch forwards, without reference to the forwarding rules, request responses to the network port associated with the request source address and replaces the response source address with the request destination address associated with the distributing computing system.

30 Claims, 3 Drawing Sheets

SYSTEMS, METHODS AND DEVICES FOR SCALABLE EXPANSION OF RULES-BASED FORWARDING PATHS IN NETWORK COMMUNICATIONS DEVICES FOR DISTRIBUTED COMPUTING SYSTEMS

FIELD OF THE DISCLOSURE

The present disclosure relates to communications devices, and methods and systems relating thereto, comprising scalable and expansive rules-based forwarding paths for network-attached communications devices.

BACKGROUND

The application is directed to networking switches that comprise of hardware configured to direct communications from a client (e.g. a data client) to nodes in a distributed computing system (e.g. distributed data storage system).

In general, network switching devices utilize a set of forwarding rules to forward data units for a given protocol (which may be referred to, generically, as Protocol Data Units, or PDU) over a network. The number of these rules is limited in accordance with pre-determined number of rules available on a given one or more processors in a switch, e.g. an Ethernet chip or chipset. In cases where there are a large number of clients, and/or a large number of host nodes, for example in a distributed computing system servicing a large number of clients, the number of forwarding rules can be limiting or even overwhelmed.

In many types of destination address based forwarding, (or other type of Layer 2 ("L2") communications, where L2 refers to communications relating to the datalink layer), such as MAC address-based forwarding, and standard IP forwarding (or other type of Layer 3 ("L3") communications, where L3 refers to the network layer), such as IP address-based forwarding, switching devices have a limited number of rules for forwarding PDUs. In some exemplary embodiments, such limited number of rules may be on the order of 128k or 256k per device in recent generations. As an example, a switch may obtain a destination address directly from the header information in a PDU (and in some cases some additional information), and using this information, the switch returns a port number into which the PDU is forwarded. In the context of Software Defined Networking (SDN), switches that use rule-based forwarding, such limitations on the number of rules—particularly, but not necessarily in the association with coarse forwarding instructions—may be overly limiting.

The terms data plane and forwarding plane relate to the communications architectures that relate to forwarding-plane hardware that provide very high speed PDU forwarding decisions, often in network switching contexts. In general, the memory architectures that embody the high-speed forwarding decision-making include content-addressable memory (CAM) and/or ternary content addressable memory (TCAM). A forwarding plane may refer to aspects of any multilayer switch that forwards frames, packets, and possibly other PDU at high speed (possibly on application specific hardware or chipsets). In some cases, specific L2 and L3 components, such as routing tables or Access Control Lists (ACLs), are cached directly into hardware. Routing, switching, ACL and Quality of Service (QoS) tables are stored in a high-speed table memory so that forwarding decisions and restrictions can be made in high-speed hardware. Switches perform lookups in these tables for result information, such as to determine whether a packet with a specific destination IP address is supposed to be dropped according to an ACL, or whether to direct such PDU to a specific port or other destination associated with the IP address (for a PDU that is a packet).

Many commercial switches deploy these memory tables using specialized CAM and TCAM memory architectures. The CAM tables provide a binary decision-making scheme (i.e. based on true/false or 1/0). TCAM, by contrast allows three states: 1, 0 and "don't care", e.g. wild card. TCAM, therefore, provides for more complex rules. TCAM, as with certain other types of memory tables, may also permit the use of forwarding rules across layers (so not just one of L2 or L3, or indeed just those layers). TCAM, however, is very power hungry and expensive, and the tables are much smaller. TCAM may only have ~1500 entries. As such, a conflict arises between a requirement for high-throughput and/or low latency computing functions and a system with either or both of a high number of clients and/or a high number of distributed hosts, particularly when the clients and hosts are interfaced by a single or low number of switching devices, and the hosts are intended to be scalable.

Current solutions such as Link Aggregation Group (LAG) and Multi-Chassis Link Aggregation Group (MLAG) for increasing bandwidth of network devices utilize forwarding rules so that a plurality of ports on a given device, or a plurality of devices, can appear to an originating device or a destination device as a single device. Such solutions operate in a context of stateless communication, so may not be appropriate for some communications protocols. Equal Cost Multi-Path (ECMP) routing also provides an alternative solution by providing for alternative routes to a given destination as network nodes become saturated. In either case, however, forwarding continues to be achieved in a deterministic manner—for either the data path as a whole or the destination. In general, hashing based on a packet-related characteristic, usually the originating or destination MAC address, is a common methodology for implementing forwarding rules. As such, the rules-based limitation is not overcome as the number of clients and the number of destinations increases—the path, or the rule associated with forwarding the packet, is based on the origin or destination MAC address, which will increase beyond the ability for the limited rules to handle. Hashing normalizes the distribution of client-host interaction, as well as other benefits, but does not scale the number of associations for a deterministic communication path.

Accordingly, there is a need for addressing some of the shortcomings identified above, as well as other issues relating to rules-based forwarding. This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary and a basic understanding of some aspects of the disclosed subject matter. This summary is not an exhaustive overview of the embodiments or aspects of the disclosed subject matter. It is not intended to restrict key or critical elements of the disclosed subject matter or to delineate the scope of the disclosed subject matter beyond that which is explicitly or implicitly described by the following description and claims.

A need exists for systems, methods and devices for overcoming rules-based forwarding limitations in high-speed routing or forwarding systems, particularly in distributed computing systems.

In accordance with one aspect, there is provided a distributed computing system comprising: a plurality of distributed computing hosts that process client requests from a computing client, said client requests comprising a request source address associated with the computing client and a request destination address corresponding to the distributing computing system, wherein request responses responsive to said client requests are returned to the computing client by one of said plurality of distributed computing hosts, said request responses having a response source address that is the same as the request destination address of the client request when received by the given distributed computing host and a response destination address that is the same as the client request source address of the client request when received by the given distributed computing host; and a programmable network switch, comprising two or more network ports for communicatively interfacing said plurality of distributed computing hosts and said computing client, said programmable network switch operable to forward client requests to a given network port based on forwarding rules related to the client source address; wherein the programmable network switch replaces the request destination address of a given client request with an incoming network port indicator that identifies on which network port a given client request is received; and wherein the programmable network switch forwards request responses corresponding to the given client request to the network port associated with the incoming network port indicator in the response source address and replaces the response source address with the original request destination address of the given client request.

In accordance with another aspect, there is provided a method stateless network communication with a distributed computing system, the distributed computing system for processing client requests from a computing client, said client requests comprising a request source address associated with the computing client and a request destination address corresponding to the distributing computing system, wherein responses to said client requests are returned to the computing client by the distributed computing system, said responses having a response source address that is the same as the request destination address when the client request is processed and a response destination address that is the same as the client request source address when the client request is processed, the distributed computing system further comprising a programmable network switch for forwarding client requests based on forwarding rules related to the client source address, the method comprising the steps: receiving a client request at the programmable network switch; replacing the request destination address of a given client request with an incoming network port identifier corresponding to a network port on the programmable network switch on which the given client request arrived, the incoming network port being exposed to the computing client; forwarding the given client request to a second network port exposed to distributed computing hosts, said second network port being identified by forwarding rules that depend on the request source address; receiving a request response corresponding to the given client request at the programmable network switch; determining the incoming network port identifier for the given client request corresponding to the request response using the response source address and then replacing the response source address with the request destination address from the corresponding given client request; and forwarding the request response to the network port corresponding to the network port identifier.

In accordance with another aspect, there is provided a programmable network switch for a distributed computing system, said switch comprising: one or more client-associated network ports for receiving client requests from computing clients and forwarding request responses to said computing clients responsive to said client requests; one or more host-associated network ports for forwarding client requests to distributed computing hosts and receiving request responses from said distributed computing hosts responsive to said client requests; a forwarding plane memory comprising a plurality of forwarding rules that forward client requests to a given host-associated network port depending on information in said client requests; wherein said client requests comprise a request source address associated with a computing client and a request destination address corresponding to the distributing computing system, and wherein request responses comprise a response source address that is the same as the request destination address of the client request when received by a given distributed computing host and a response destination address that is the same as the client request source address of the client request when received by the given distributed computing host; and wherein the programmable network switch replaces the request destination address in a given client request with an incoming network port indicator that identifies on which client-associated network port the given client request is received; and wherein the programmable network switch forwards a given request response corresponding to the given client request to the network port associated with the incoming network port indicator in the response source address of the given request response and replaces the response source address of the given request response with the original request destination address of the given client request.

In some embodiments, there are provided methods, systems, and devices for expanding forwarding-rules limitations in switches, including multilayer switches, for or in distributed computing systems. In such systems, particularly when said distributed computing systems, comprising a plurality of hosts, is interfaced with clients via a common switch or switches and high-speed and/or high-throughput performance may be needed. Embodiments hereof provide for a stateless connection between a given client and the host or hosts providing functionality and, in some embodiments, then responding to said client or other entity. Whereas current solutions may require a rule, and in some cases two rules (one inbound and one outbound) on how to forward a packet (or other PDU) at the switch, subject matter disclosed herein provides for an expansion of said rules in the context of a high-performance switch.

Aspects of the subject matter described herein provide methods, systems and devices that support "stateless" load balancing for a plurality of hosts addressable by (or exposed by) the same IP address, including for communication that may or may not utilize stateful communications methodologies. In other words, any given client requesting services from a host within a distributed computing system does not need to be stateful with respect to said host, in part because the host may pass the necessary connection to another host capable of providing the same function (and, in some embodiments, it can respond appropriately in a manner that, irrespective of communications methodologies that are implemented, overcomes inherent issues relating to the request response not originating from the same node as expected by the requesting device). In a distributed computing context, this may for example, provide an ability for a computing function load to be shared or distributed across multiple hosts, or transferred to one or more hosts having operational characteristics that are in better alignment with the priority (or other operational requirements) associated with the request or requests, the data relating to said request(s), or the clients making said request(s). By encoding the request itself, as it passes via the switch, with information relating to source and/or destination of a given request (or the corresponding response), the number of associations stored in the forwarding table (e.g. CAM or TCAM) can be reduced since information relating the forwarding of a corresponding request can be determined by the switch from the encoded information rather than having to determine such information from a lookup table or by using processing power of the switch. In some embodiments, information regarding the source of the request can be stored in the request itself by the switch, by amending, for example, header information Since many communication protocols (e.g. TCP, as a non-limiting example of transport layer or other stateful or non-stateful communication protocols) utilize incoming source information in requests as outgoing destination information in responses, the subject matter disclosed herein may take advantage of this functionality to forward outgoing responses based on information embedded by an intermediate switch, thereby not requiring outgoing rules for forwarding. This will essentially double the number of rules that are available; in some cases, taking further advantage of, for example, TCAM wildcard functionality, more than double the number of rules can be saved. Since TCAM, and other forwarding architectures may permit multiple states on bit-by-bit basis in address to be used for forwarding rules, the number of rules need not be limited by increased number of hosts and/or clients.

As data storage systems use more distributed data storage resources, and are utilized in virtualized manner, particularly in cloud-based environments, the number of data flows from a given user to a given data storage location, may approach the current limits associated with many network switching devices. A way to manage this limitation is required.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

Figure 1:
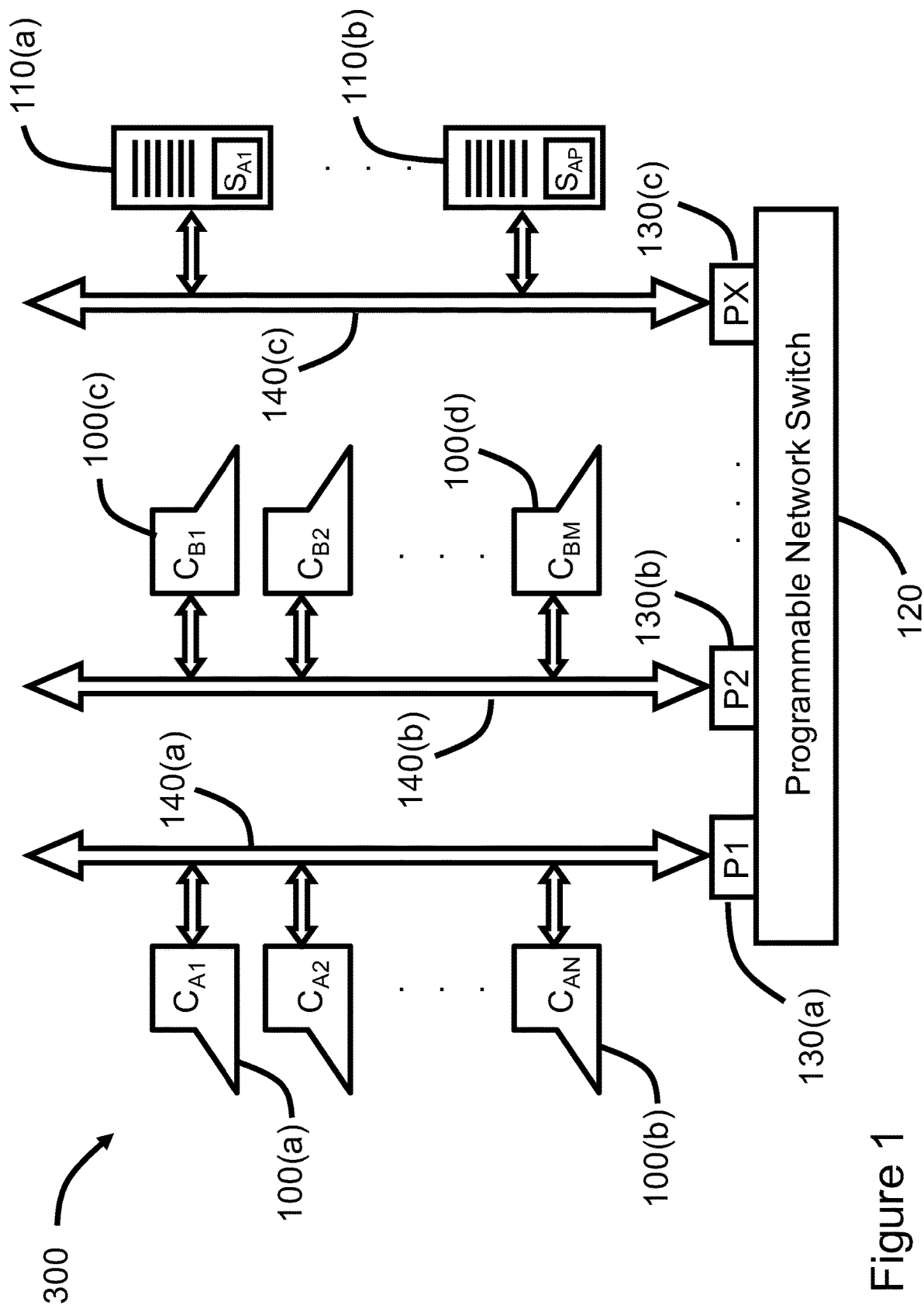
FIG. 1 is an overall system showing the relationships between clients, servers, the programmable network switch, and network ports.

The systems and methods described herein provide, in accordance with different embodiments, different examples in which systems, methods and devices for scalable expansion of rules-based forwarding paths in network communications devices for distributed computing systems are described in additional detail. The following examples are illustrative in nature and are not intended to be exhaustive examples of the claimed subject matter. Examples relating to distributed computing systems of a specific type, e.g. data storage, are intended to be exemplary in nature and not intended to limit this disclosure to the exemplary specific type of computing system.

Embodiments of the subject matter disclosed herein may be used to replace deterministic forwarding rules to provide a non-stateful data path; in embodiments, the provision of non-deterministic forwarding rules is irrespective of whether the protocol is stateful or not. In many distributed data storage systems, there may not be a persistent per-user/per-flow determinant associated with a given data path over port and/or switch. In other words, turning to data storage as an example, while responses need to always return to the requesting or originating address, the request may be associated with any one or more of a plurality of nodes on the data storage system side—and this association may change over time. The data path need not be stateful with respect to any given storage node in a distributed data storage system, and the data client in this example may have no visibility to which or how many data hosts are involved in responding to any one or more data requests. Responses to client requests, therefore, can be returned to the originating client but, in some cases, without requiring a set of per-client rules. While many of the exemplary embodiments herein relate to response/request pairs associated with data storage, other types of distributed data processing servers may be used. In such embodiments, where there is at least one intermediate switching device that, in part, acts as an interface between the clients (or, e.g., the DMZ) and the hosts, the switching device can apply the same methodologies disclosed herein for other types for request/responses; for example, a web server, an e-commerce server, a web services server, a database, an email server, or application-specific server can be substituted for the data storage hosts. In such cases, an incoming message is encoded with source information and incoming port information, which causes an outgoing message to be sent to the client sending the incoming message without reference to any lookup table or other switch-based analysis, as such outgoing message bears source and incoming port information corresponding to destination and outgoing port information in the interfacing switch associated with the incoming message. In other embodiments, a virtual computing unit may be running on any type of server that emulates another type of server; for example, in some case a virtual computing unit, such as a container, jail or virtual machine, can be run so as to emulate an application-specific or other type of server within the environment of distributed data storage hosts. In such cases, the virtual computing unit may emulate a physical unit, but in fact is a subset of storage available on one or more physical units, or is an aggregate of one or more physical units or subsets of storage resources thereof.

In one embodiment, a rule relating to one or more arbitrary bits in an arbitrary field, or in the case of non-normally distributed values, one or more arbitrary bits of a hashed result of an arbitrary field, may be used to determine how to distribute an arbitrary or non-arbitrary class of data units (e.g. packets), each PDU being associated with a given request, to a particular one or more servers. For example, a function "f" can be constructed such that f(value)=[hash (value) %2], where "value" is the MAC address of the source port. This function will always return a value of 1 or 0. In an illustrative example, a switch can thusly direct all data packets having an f(value)=1 to a given storage node or set of storage nodes. This implements a load-sharing or other distribution algorithm, wherein the client's address is used to determine which server handles the request. The switch also needs to forward the reply back to the client. To accomplish this, the switch needs to learn and remember the port on which the client request first arrived. Traditionally in a rule based approach, two rules would be used (one to direct the request to a server, one to direct the reply back to the client). Instead, to reduce the number of rules—the switch may replace the destination MAC (or other) address with a value corresponding to the ingress port on the switch (effectively, tagging the header of the PDU with return forwarding information). Storage associated with data relating to a given request-response pair may be reassigned over time, at which time the forwarding rules may change to reflect this, or the storage nodes may forward requests/responses in accordance with an applicable PDU forwarding scheme in order to reach to appropriate storage location to provide requested data or accommodate data for storage (depending on whether the request is a read or a write). The packet is forwarded to the egress port corresponding to the server as determined by the evaluation of function "f". When a response is returned from the server to the switch at the given server-side port, the switch will forward the PDU back to the client using the source mac address to determine the egress port, and restore the destination server's MAC (or other) address (which is now the source address on the request response) in the header with the address corresponding to the server.

While the above example relates to the use of distributed data storage behind a software-defined switch, any system comprising common data path or set of data paths in front of a plurality of nodes operative to provide distributed services thereon can utilize this solution. The rules expansion functionality is applicable in a broad variety of distributed computing contexts, including systems having high request and/or data throughput and in scenarios in which there are a high number of clients that access the system via the switch, or a high number of nodes that are accessed via the same switch (or group of switches), or a combination thereof.

In one embodiment, there is provided a distributed computing system comprising a plurality of computing hosts that process client requests from computing clients. The hosts in such a system may each comprise one or more data storage resources, such as a hard drive, flash drive, or any other type of data storage device. Some systems may provide a virtualized environment in which data storage resources from a plurality of hosts can be associated with a given virtual host or virtual machine; in such cases, a given virtual host or machine may utilize data storage resources from a plurality of the data storage resource devices, including subsets and aggregated portions there, which may be from distributed physical computing devices. These associations, in some embodiments, may not be static. In other words, the physical location of data storage may change for a given host, virtual or otherwise, or for a given data object over time as data is moved amongst the data storage resources depending on requirements. As such, the destination for a data request from a data client may change, without the data client being notified or otherwise being aware of such a change. As such, the distributed computing system disclosed herein implements data unit forwarding mechanisms so that data units relating to a particular data request is sent over, for example, the correct port so that a data unit relating to a data request is directed to the computing host where the data is stored (or such computing host is configured to forward the data unit to the appropriate computing host, directly or indirectly). In some cases, the distributed computing host is a data storage component comprising one or more data storage resources; in some cases, the distributed computing hosts may be a virtual computing host that, from the perspective of at least the data client and in some cases any intermediary switch forming part of the distributed computing system, can be interacted with in the same manner as a physical host.

In some embodiments, the data client may refer to any user, user computing device, or user computing system that uses the distributed computing system. It may include in some cases an individual user (e.g. using a computer, a browser, a mobile computing device, etc.), a requesting computing system, or a class thereof. The user may not always interact directly with the distributed computing system as, for example, the distributed computing system may provide data storage services for another type of system, such as an ecommerce system (in which case, either the end user's computing system or the ecommerce system may be considered to be the data client depending on context). Any entity may be considered a user or system which: (a) sends a communication requesting a service, such as the writing or reading of data (e.g. for a data storage system), requesting information relating to files that form web pages (e.g. for a web server system), requesting information relating to emails (e.g. an email server), requesting information to other systems (e.g. a proxy server system or other type of communications server and/or domain server system), or requesting information relating to the carrying out of specific functions (e.g. on an application server or system), as a number of non-limiting examples; and (b) receives a response to such a request. In some embodiments, client requests may comprise such requests sent by a data client. In some embodiments, they comprise or are communicated as data units, which are generally associated with a protocol (i.e. a protocol data unit, or PDU). Exemplary PDUs include, but are not limited to, bits, symbols, frames, packets, segments, datagrams, and application-layer and/or application-specific units. A PDU that is a request (e.g. a data request) comprises a request source address associated with the computing client and a request destination address corresponding to the distributing computing system, e.g. a MAC address, IP address, or both.

In some embodiments, responses to client requests are returned to the computing client by one of said plurality of distributed computing hosts, said responses having a source address that is the same as the request destination address of the client request when received by the given distributed computing host and a response destination address that is the same as the client request source address of the client request when received by the given distributed computing host. Each of the data request, and corresponding data request responses, comprise certain information embedded therein, often in the header of the PDU associated with such data request and corresponding data request response. Such information may include one or more types of source and destination address, including for example (but not limited to), IP and MAC source and destination addresses. When a data unit relating to data request is received, the distributed computing system determines the port for forwarding the data unit using standard lookup rules using the destination address information, then replaces the destination information in the data request with the incoming request port (i.e. the port over which the request was received). The data unit is forwarded to appropriate port as determined using look-up techniques. When a response is returned, the egress port of the response is determined from the source information of the response, which corresponds to the amended destination information of the request corresponding with the response. The source information of the request is then amended to the value corresponding to the destination information of the original request. In some embodiments, all requests received may share the same destination response, which corresponds to the system itself. In other embodiments, the original destination relating to a server or set of servers on the system is stored prior to its replacement by the egress port of the request in association with an identifier relating to the request and/or response and/or request-response pair; the stored destination value of the request is then used to amend the source information of the response to ensure that the response is not rejected after forwarding to the appropriate egress port back to the client (either by the client or any intermediate network component), which may occur in systems using protocols with QoS requirements (e.g. TCP). In other cases, the system may be configured so that the client and/or any intermediate network components between the egress port of the response and the client, will accept responses having source information that is not the same as the destination information of the corresponding request; in such cases for example (without limitation), the request destination information and the response source information may be from a known range of addresses, they may share a particular amount or set of information, they may share a given format, or there may be no similarity at all depending on factors such as, but not limited to, the network layer associated with the data unit, the type of address information, the data unit type, settings at the client, switch or server, or other factors.

In embodiments, a programmable network switch is a computer networking device that connects devices on a communications network, and which uses switching logic and/or functionality to receive, process, and forward data. In embodiments, the programmable network switch interfaces the clients and the one or more server(s) of the distributed computing system. In general, the programmable network switch comprises two or more network ports for communicatively interfacing said plurality of distributed computing hosts and said computing client. In some cases, a subset of the ports is for data units received from or sent to the client and another subset of ports is for data received from or sent to system nodes, although it may be possible in some embodiments that some or all ports can accept communications from or to both nodes and clients. In some embodiments, the programmable network switch is a multiport network bridge that uses hardware addresses to process and forward data at the data link layer (layer 2) of the OSI model; in other cases, the programmable network switch may process data at the network or other layer by additionally incorporating forwarding functionality that most commonly uses IP addresses to perform packet forwarding, including as a layer-3, or multilayer switch. In embodiments, PDU forwarding using the rules-saving benefits hereof may be implemented using other layer information, such layers commonly referred to as L4 to L7.

In embodiments, the programmable network switch is operable to forward client requests to a given network port based on forwarding rules related to the client source address and/or the destination address. In embodiments, the programmable network switch may utilize Content Addressable Memory (CAM) to provide high speed forwarding information; since CAM is designed to search its entire memory in a single operation, it is much faster than RAM in virtually all search applications, whereas RAM may have additional flexibility and may, therefore, be used on certain embodiments. In some cases, RAM uses a memory address is used to get the data stored at a given memory location, while with CAM the inverse may be carried out. CAM returns the address where the data is stored based on information relating to the data (i.e. an address). Also, the CAM is considered to be faster than the RAM since the CAM searches the entire memory in one operation.

In general, CAM tables provide two results: 0 (true) or 1 (false). CAM-based switching technology may therefore be directed to switching methodologies that make forwarding decisions based on matching exact values, such as MAC address information matching to a given port in a switching device. The CAM table is the primary table used to make Layer 2 forwarding decisions, but is not limited to L2 decisions in all embodiments. In the case of L2 switching tables, a CAM-based switch may use tables to determine an exact match to a destination MAC address or, in some cases, the switch forwards packets to all ports in the programmable network switch if there is no associated port or rule corresponding to a given packet. In some embodiments, a lookup table is populated by determining and then writing to said table the source address and inbound port of all frames (or other PDU). For example, PDU arrive on switch ports, the source MAC addresses are learned and recorded in the CAM table. The port of arrival and the VLAN are both recorded in the table, and in some embodiments, a timestamp is associated with such information. If a MAC address that was previously associated with a particular switch port should instead be associated with a different port (because, for example, the information and/or storage location associated with the request is moved to another location or a copy stored at another location is designated as the live or primary copy, such location being on a node that is accessible by such different port), the MAC address and timestamp are recorded for the most recently determined port (or in some cases, the most recently designated port). Then, the previous entry may be deleted in some embodiments. In some embodiments, if a MAC address is already associated in the table for the newer port, no update may be necessary or only its timestamp may be updated. In some embodiments, the programmable network switch can amend the relationships between address/timestamp, such as when the distributed computing system moves the location associated with the request (i.e. stored data is moved to a different resource, or a different node with more appropriate processing power). When a PDU arrives at the switch with a destination MAC address of an entry in the CAM table, the frame is forwarded out through only the port that is associated with that specific MAC address. Whereas a specific rule is generally required in most CAM switches for each of the incoming request and the outgoing response (or acknowledgment), instantly disclosed embodiments do not necessarily require a rule for forwarding all outgoing responses: the outgoing port information (corresponding to the incoming port for the incoming request in many cases) is obtained by the switch from information stored within response PDUs themselves. Since information for forwarding can be classes or ranges of addresses, or based on an algorithm for purposes of load balancing or prioritizing certain types of data storage for a given type or class of data, for example, the number of rules that can be saved on top of the avoidance of needing an outgoing rule for every incoming request is greatly increased.

In some embodiments, the programmable switch may utilize memory for storing forwarding rules in Ternary Content Addressable Memory ("TCAM"). TCAM, in addition to having matching responses of 1 and 0, can also match a third state, which is a wildcard, or any value. TCAM may be characterized as a specialized CAM designed for efficient and/or high-speed table lookups that permits three results: 0, 1, and a wildcard. TCAM may be useful for building tables for searching on longest matches such as IP routing tables organized by IP prefixes. The TCAM table in some embodiments may also store access control lists, quality of service requirements, storage performance and data characteristic matching, and other information generally associated with upper-layer processing. In some embodiments, multiple TCAMs (or multiple CAMs or combinations thereof) may be utilized. In some embodiments, such multiple TCAMs/CAMs may be used so that security, quality of service, access control, or other functionality, can be applied simultaneously or entirely in parallel with an L2, L3, or other layer forwarding decision.

In some embodiments utilizing TCAM for forwarding decisions, the wildcard (or "don't care") matching may be implemented as follows. The term VMR (Value, Mask and Result) may be used to refer to the format of forwarding rules or entries in a TCAM switching table in the following exemplary illustrations: the "value" refers to the pattern that is to be matched in a given piece of information, such as IP addresses, protocol ports, DSCP values, or other exemplary PDU information; the term "mask" refer to the specific bits in the PDU information associated with the pattern; and the "result" may refer to the result or action that is implemented by the TCAM-based switching device when the TCAM rules table determines that a given PDU meets the criteria associated with a particular pattern and mask rules. Such a "result" may include, for example, a "permit" or "deny" in the case of a TCAM for ACLs, values for QoS policies in case of QoS, or a pointer to an entry in the hardware adjacency table, other table or other set of rules/algorithm that contains the forwarding information used to forward the PDU (and in some cases re-write information into the TCAM table). In one example, the use of wildcards can be associated with one or more bits in a field that can be uniquely associated with a given client address (or other client-identifying field in, for example, a packet header) can be used to direct traffic across the switch. For example, the last two bits of the hashed originating address (e.g. the MAC address of the client) can be assigned to nodes as follows: values having hashed origin MAC address with the final two bits (or any two arbitrary bits in some cases) of 0X (meaning that in order to have a match, the first bit must be "0" and the second bit can be 1 or 0) are directed to server A, those with 1X are directed to server B. As such, four data paths, which would ordinarily require 8 client-specific rules (i.e. 4 inbound and 4 outbound) can be directed using 2 rules in some embodiments of the instant disclosure.

In some embodiments, the programmable network switch is configured to amend information contained within the PDU, including the payload and the header. The programmable network switch is configured to both use the header information in the PDU to make a forwarding decision, while amending the same or other information prior to forwarding the PDU. In some embodiments, the programmable network switch replaces the request destination address with information that will enable the programmable switch to forward a corresponding response (or acknowledgement related to that request, to be forwarded without reference to the forwarding rules, for example, stored in TCAM or CAM associated with the switch. In some embodiments, other information or information field that will not be needed to direct the PDU to the appropriate port (or, depending on the embodiment, to the appropriate network component or segment, and/or destination) may also be used to store the response/acknowledgement forwarding information. In some embodiments, the request destination address is replaced with an incoming network port indicator that identifies on which network port a given client request is received. In some embodiments, the programmable network switch can then forward, without reference to the forwarding rules, request responses to the network port, or other network component or destination, associated with the request source address. In some embodiments, the programmable network switch replaces the response source address with the request destination address associated with the distributing computing system; such replacement may be to amend the PDU so that it comprises the same information in its source information as in the destination information in the original corresponding request, particularly so that any quality of service requirements associated with certain communications protocols are complied with so as to avoid interrupting the communication (e.g. TCP responses/acknowledgements are not permitted if the source information does not correspond with the destination information of the related request). Not all communication modes or communication protocols must comply with such QoS requirements and, as such, in some embodiments, the amendment to the response may or may not be necessary and may or may not necessarily match the incoming information that was amended by the programmable network switch. In some embodiments, other fields in the header (and indeed, fields or portions of the payload) may be used to "carry" forwarding information that is returned in a response (or acknowledgement) and which is used by the switch to forward information without reference to the forwarding rules.

In some embodiments, the request destination information may comprise any information that identifies, or may be used to identify in connection with other information, one or more of the following types of forwarding information: the intended or required destination, the port from which the intended or required destination is accessible, or a group of network components from which the intended or required destination is accessible. The information may include a request destination address, which may include one or more of the following: a MAC address or an IP address. Similarly, the request source information may be any information that identifies, or may be used to identify in connection with other information, the source of the PDU, the port from which the PDU arrived, or a group of network components from which the PDU arrived; it may include a request source address, such as a MAC address and an IP address. It may include a combination of these elements. It may include one or more of the elements along with additional extraneous information (e.g. timestamp, port of ingress, etc.).

In some embodiments, a PDU will comprise a data request or a portion thereof. In embodiments in which with the distributed computing system comprises a distributed data storage system, the data request may comprise one of a read request, a write request, an update request, or a delete request. A read request will comprise information regarding the information that is already stored in the distributed data system, and the corresponding response may comprise an acknowledgement relating to the request or the requested data, a response comprising some or all of the requested information, or a response indicating that the requested information is not available, or a response indicating some other error. The data request and the data request response will both comprise a header, which in turn comprises certain information about the PDU, including source information, destination information, timing and/or ordering information or other information indicating a given PDU's relationship to other related PDUs, and other metadata or QoS information. They will also comprise a payload, which is where information relating to the request is included; for example, the payload of a read request is small, and the payload of a read request response is relatively much larger as it returns the requested information. In cases where a data request constitutes a write request, the data request will comprise in the payloads of all the PDUs that carry the data request, all the data that is to be written to the system. The write request response PDU payload will be comparatively much smaller and may often comprise a confirmation or acknowledgement of the write (although in some cases it may include the data written to storage). An update data request may comprise data within the payload(s) of the one or more PDUs associated with said data request, as well as information that can be used to identify the currently stored data to be updated (or location thereof); an update request response may comprise a confirmation or acknowledgement, and in some cases the information that has been written to storage akin to a read request. In some cases, the data request is a delete request, which carries in its payload identifying information relating to the data that is to be deleted (or location thereof), as well as instructions to delete (although a delete request may itself constitute a delete request); a delete request response may comprise a confirmation or acknowledgement of receipt or of deletion. For each type of request, including in distributed computing systems other than data storage systems, a response may be generated upon an error; including when the data and/or the applicable storage location is unavailable, or upon other protocol or communications system issues (e.g. QoS errors in TCP, such as a missing or dropped packet/segment).

In some embodiments, the distributed computing system may be any type of distributed computing system. For example, the distributed computing system may provide the services of a web server, email server, file server, domain server, database server, or other server types known in the art. While many of the exemplary embodiments have been described in the context of a distributed data storage system, other systems that provide other computing services may utilize the disclosed subject matter to forward requests and corresponding request responses.

Referring to FIG. 1, there is shown a system 300 consisting of a plurality of clients CA1 100(*a*) through CAN 100(*b*), and CB1 100(*c*) through CBM 100(*d*) connected to their respective local area networks (LANs) 140(*a*) 140(*b*), with all LANs 140(*a*) 140(*b*) 140(*c*) connected to their respective ports P1 130(*a*), P2 130(*b*) through to PX 130(*c*) via a programmable network switch 120. There is also shown a plurality of servers SA1 110(*a*) through SAP 110(*b*) also connected to their respective ports, for example port PX 130(*c*). In such a system 300, a given client (for example, CA1 100(*a*)) may wish to communicate with a given server (for example SA1 110(*a*)) to request data relating to a data object stored thereon. The programmable network switch 120 facilitates the communication by creating a communications path from the client CA1 100(*a*) through port P1 130(*a*), routing the message internally through the programmable network switch 120, and presenting the message on port PX 130(*c*). The message them appears on the LAN 140(*c*) and the server SA1 110(*a*) receives the message. In the response case (that is, when the server has taken the client's message, processed it, and is now in a position to return information back to the client), the process is reversed: the response message originates on the server SA1 110(*a*), is transferred to the LAN 140(*c*), is received on the port PX 130(*c*), is routed by the programmable network switch 120 to port P1 130(*a*), is emitted onto the LAN 140(*a*) corresponding to the client CA1 100(*a*), and is finally received by the client CA1 100(*a*).

Figure 2:
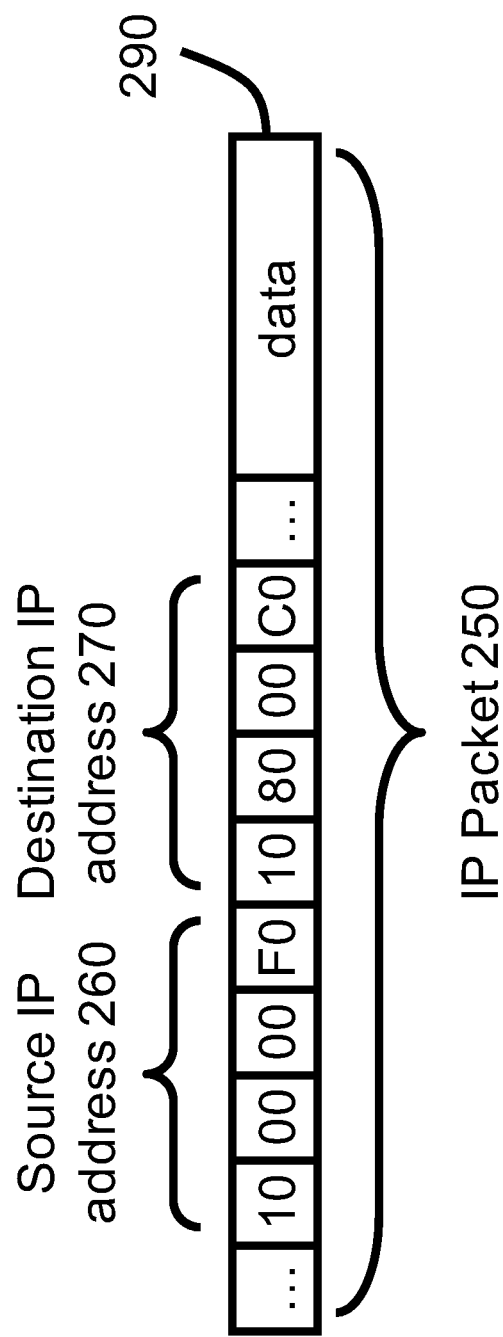
FIG. 2 shows an exemplary representation of a IP packet relating to data request.

Turning to FIG. 2, a conceptual representation of a given request (or response) PDU is shown. Every station on the network (whether it's a client like CA1 100(*a*) from FIG. 1, or a server like SA1 110(*a*) from FIG. 1) has a network address. In this example, an IPv4 network based on top of an Ethernet link will be considered. In order for a client to communicate with a server in this example, both network addresses are known. FIG. 2 shows an exemplary IP Packet 250 which contains a source IP address 260, a destination IP address 270, and data 290 which forms the payload (the message content). In this example, the source IP address 260 is shown in hexadecimal notation, and is the IPv4 address 10.0.0.240, and the destination IP address 270 is also shown in hexadecimal notation, and is the IPv4 address 10.128.0.192. For purposes of illustration, it may be assumed that the source IP address 260 corresponds to the IP address of the client CA1 100(*a*) from FIG. 1, and the destination IP address 270 corresponds to the IP address of the server SA1 110(*a*) from FIG. 1. However, these two addresses (the source IPv4 address 260 and the destination IPv4 address 270) are not used for the actual message transport on the LAN (like the LAN 140(*a*) from FIG. 1). For transport on the LAN itself, a lower-level addressing scheme is used.

Figure 3:
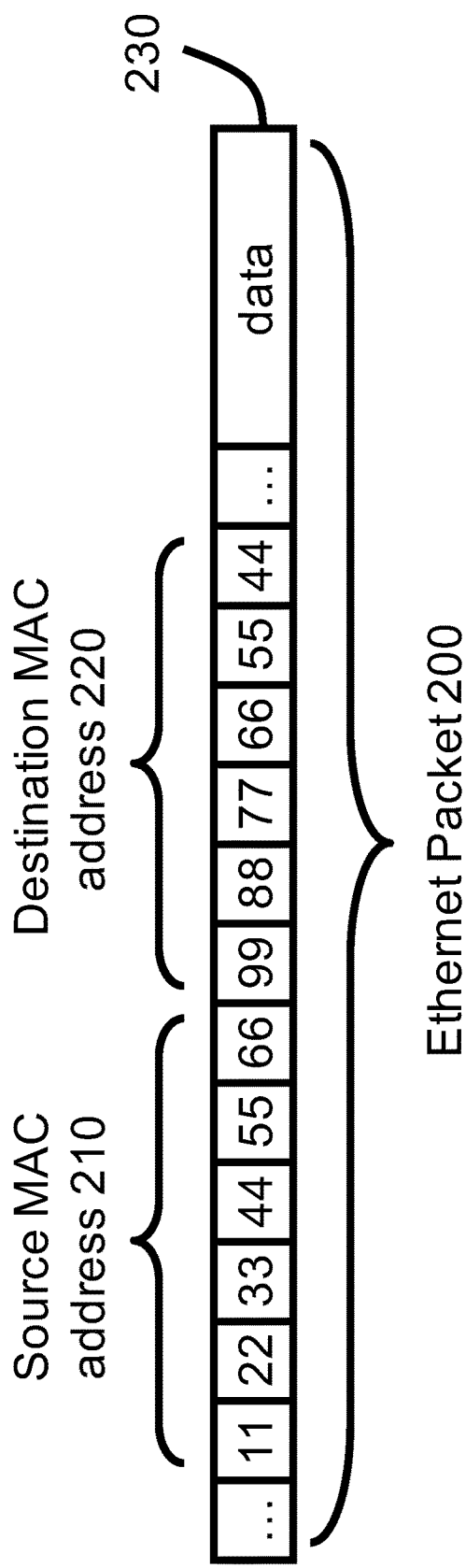
FIG. 3 shows an exemplary representation of an Ethernet frame relating to data request.

In FIG. 3, we see this lower level addressing scheme in the form of an Ethernet Packet 200 which contains a source Media Access Control (MAC) address 210 and a destination MAC address 220, as well as payload data 230. As is known in the art, the entire IPv4 packet 250 from FIG. 2 is contained within the data portion 230 of the Ethernet Packet 200. The MAC source 210 and destination 220 addresses are used for routing of the Ethernet packet 200 on the LAN (like the LAN 140(*a*) from FIG. 1). In a traditional system (like the system 300 from FIG. 1), then, the message from the client 100(*a*) is forwarded based on the MAC address which was looked up based on the IPv4 address. That is to say, the IPv4 address is a higher-level address (L3), and the MAC address is a lower level address (L2).

In the present disclosure, the client CA1 100(*a*) wishes to utilize the services of a server, but doesn't necessarily know or care which particular server (whether it's SA1 110(*a*) or SAP 110(*b*) or any other available server). The client CA1 100(*a*) has resolved the IPv4 address into a MAC address, and sends its request (formatted as an IP packet 250 from FIG. 2) to the switch. The switch replaces the destination MAC address 220 from FIG. 3 with an indication of the ingress port P1 130(*a*) from FIG. 1 corresponding to the client. At this point, the packet consists of the original source MAC address 210, and a modified destination MAC address 220. While at this point, it may appear that the packet is no longer routable (because the destination MAC address has been replaced with a different value), there are in fact a plurality of methods available to route the packet as are known in the art. One such method is that the server SA1 110(*a*) has placed its Network Interface Card (NIC) into what is known as "promiscuous" mode, and is able to listen to transmissions on any MAC address. The server SA1 110(*a*) would then select traffic that it was interested in handling. Another method known in the art is to program the NIC with a plurality of MAC addresses, each of which will cause the message to be delivered by the NIC to the server. In this manner, a cooperation exists between the programmable network switch's 120 transformation of the destination MAC based on ingress port (e.g., P1 130(*a*) from FIG.

1) and the list of responsive MAC addresses programmed into the servers (e.g. SA1 110(a) from FIG. 1).

In embodiments, distributed data storage systems may comprise data storage components, and storage resources therein. Such storage components within the data storage system can be implemented with any of a number of connectivity devices known to persons skilled in the art, even if such devices did not exist at the time of filing, without departing from the scope and spirit of the instant disclosure. In embodiments, such storage components may be implemented with one or more storage resources therein, including higher tier storage device such as, for example, flash storage devices. In examples using flash, such devices may use SAS and SATA buses (~600 MB/s), PCIe bus (~32 GB/s), performance-critical hardware like network interfaces and GPUs, and/or other types of communication components, that transfer data between components inside a computer, or between computers. The storage components may also include other types of storage devices, either in addition to or as an alternative to such higher tier storage, for example spinning disks.

In some embodiments comprising two or more storage devices in distributed storage components, PCIe flash devices may be used, which provide significant price, cost, and performance trade-offs as compared to, for example, spinning disks. The table below shows typical data storage resources used in some exemplary data servers.

|  | Capacity | Throughput | Latency | Power | Cost |
| --- | --- | --- | --- | --- | --- |
| 15K RPM Disk | 3 TB | 200 IOPS | 10 ms | 10 W | $200 |
| PCIe Flash | 800 GB | 50,000 IOPS | 10 μs | 25 W | $3000 |

In some embodiments, PCIe flash used in some storage devices may be about one thousand times lower latency than spinning disks and about 250 times faster on a throughput basis. This performance density means that data stored in flash can serve workloads less expensively (as measured by IO operations per second; 16× cheaper by IOPS) and with less power (100x fewer Watts by IOPS). As a result, environments that have any performance sensitivity at all should be incorporating PCIe flash into their storage hierarchies (i.e. tiers). In an exemplary embodiment, specific clusters of data are migrated to PCIe flash resources at times when these data clusters have high priority (i.e. the data is "hot"), and data clusters having lower priority at specific times (i.e. the data clusters are "cold") are migrated to the spinning disks. As such, the rules-based forwarding functionality at the programmable switch not only has to accommodate possible large or dynamically changing numbers of users and/or storage components, the programmable switch must also forward PDU in a way that accommodates for dynamic storage location associations. PDU related to data that is high priority at a given time should be forwarded to destinations where they are stored on higher tier or higher performing storage devices, which may or may not be the same location as when the same data may have been of lower priority and thus associated with different data storage locations. In many such cases, the client will have no or limited visibility to such changes.

In embodiments, performance and relative cost-effectiveness of distributed data systems can be maximized by either of these activities, or a combination thereof. In such cases, a distributed storage system may cause a write request involving high priority (i.e. "hot") data to be directed to or stored on available storage resources having a high performance capability, such as flash (including related data, which may be requested or accessed at the same or related times and can therefore be pre-fetched to higher tiers); in other cases, data which has low priority (i.e. "cold") is moved to lower performance storage resources (likewise, data related to the cold data may also be demoted). In both cases, the system is capable of cooperatively diverting the communication to the most appropriate storage node(s) to handle the data for each scenario. In other cases, if such data changes priority, some or all of it may be transferred to another node (or alternatively, a replica of that data exists on another storage node that is more suitable to handle the request or the data at that time may be designated for use at that time), the switch and/or the plurality of storage nodes can cooperate to participate in a communication that is distributed across the storage nodes deemed by the system as most optimal to handle the response communication; the client may, in embodiments, remain unaware of which storage nodes are responding or even the fact that there are multiple storage nodes participating in the communication (i.e. from the perspective of the client, it is sending client requests to, and receiving client request responses from a single logical data unit). In some embodiments, the nodes may not share the distributed communication but rather communicate with each other to identify which node could be responsive to a given data request and then, for example, forward the data request to the appropriate node, obtain the response, and then communicate the response back to the data client. In some embodiments, a common address, group or set of addresses, or range of address may be associated with the computing system (and/or programmable switch) that is used by any of the clients to address the computing system, thereby resulting in requests being sent to the system, whereupon the programmable network switch is configured to forward the request to the appropriate server within the distributed computing system. The switch may be configured to determine the correct storage location (or portion of the network) on its own, or it may work cooperatively with the distributed system nodes, or it may pass off that requirement to the nodes themselves and simply pass on the request arbitrarily, whereupon the nodes operate to determine where such response should be directed. Dynamic association of storage locations within the computing system may mean that requests ought to be forwarded to different servers at different times, thus exacerbating issues relating to rules-based forwarding.

Embodiments of the instantly disclosed subject matter comprise a method for forwarding requests and corresponding request responses. Such methods may comprise a method of stateless network communication with a distributed computing system, the distributed computing system for processing client requests from a computing client, said client requests comprising a request source address associated with the computing client and a request destination address corresponding to the distributing computing system, wherein responses to said client requests are returned to the computing client by the distributed computing system, said request responses having a response source address that is the same as the request destination address when the client request is processed and a response destination address that is the same as the client request source address when the client request is processed, the distributed computing system further comprising a programmable network switch for forwarding client requests based on forwarding rules related to the client source address, the method comprising: receiving a client request at the programmable network switch;

replacing the request destination address corresponding to the distributed computing system with a network port identifier corresponding to a network port on the programmable network switch on which the client request arrived, the network port being exposed to the computing client; forwarding the client request to a second network port exposed to distributed computing hosts, said second network port being identified by forwarding rules that depend on the request source address; receiving a request response corresponding to the client request at the programmable network switch; reading the response source address to determine the network port identifier and then replacing the response source address with the request destination address corresponding to the distributing computing system; and forwarding the request response to the network port corresponding to the network port identifier.

In other embodiments, there is disclosed a programmable network switch which acts as an interface to a distributed computing system for one or more clients, which is configured to receive requests and after determining forward information from look up information accessible by said switch (e.g. in TCAM), information regarding the source and/or routing information for forwarding a corresponding response, is written onto the header of incoming requests prior to forwarding said requests to servers within the distributed computing system; upon receiving corresponding responses, the response can be forwarded so that it will be sent back to the requesting client based on the information that was written into the header of the corresponding request without having to access the forwarding rules. In some cases, that information is replaced with the original information that was overwritten within the original corresponding request prior to forwarding the response back to the client. In some embodiments, the programmable network switch for a distributed computing system, said switch comprising: one or more client-associated network ports for receiving client requests from computing clients and forwarding request responses to said computing clients responsive to said client requests; one or more host-associated network ports for forwarding client requests to distributed computing hosts and receiving request responses from said distributed computing hosts responsive to said client requests; a forwarding plane memory comprising a plurality of forwarding rules that forward client requests to a given host-associated network port depending on information in said client requests; wherein said client requests comprise a request source address associated with a computing client and a request destination address corresponding to the distributing computing system, and wherein request responses comprise a response source address that is the same as the request destination address of the client request when received by a given distributed computing host and a response destination address that is the same as the client request source address of the client request when received by the given distributed computing host; wherein the programmable network switch replaces the request destination address with a network port indicator that identifies on which client-associated network port a given client request is received; and wherein the programmable network switch forwards, without reference to the forwarding rules, a given request response to the network port associated with the request source address of that given request response and replaces the response source address of the given request response with the request destination address associated with the distributing computing system.

In some embodiments, the switch uses data requests wherein the request source address and/or the request destination address may be an IP address associated with a given computing client or server, a MAC address associated with a given computing client or server, or both. Alternatively, other information and/or combinations of information available in the header or payload of the PDU can be used as the source or destination address.

In some cases, a communication path may be characterized as stateful if it is part of a connection-oriented communication; this means that both endpoints may be required to maintain a communication channel, often through response-request pairs wherein the endpoints are stateful when they have connection between them established by acknowledgements (which may include responses) for every request that originates from the destination of the response. In some cases, the node or application that constitutes one of the end-points may be characterized as stateful when such end-point is engaged in a connection-oriented communication; when such communication ends, or is migrated to a second end-point, the first end-point becomes stateless (even if, as in this example, the same communication has continued, or the same communication channel has been established with a different end-point). TCP is connection-oriented and, as such, it may be important to ensure that any information that is encoded into requests passing through the programmable network switch is updated in the corresponding field in the corresponding response. As such, stateless data paths can be implemented in a stateful protocol, such as TCP, without requiring additional rules and other overhead at the programmable switch to forward without failing standard protocol requirements. Stateless protocols, such as UDP, can also be implemented which will nevertheless avoid the use of additional forwarding rules.

In some embodiments, a single port on the switch may be used to forward packets to a plurality of nodes (i.e. hosts). For example, in a data storage context, a number of data storage devices may be accessible via a common port. In some embodiments, additional functionality may be associated with directing a request to an appropriate (or in some cases, optimal) node for responding to the request. In some embodiments, there may be additional functionality to enable non-addressed ports to respond to a given request irrespective of the communications protocol, or irrespective of whether a connection-oriented communications channel is expected; this allows non-addressed nodes to respond to a request without interfering with protocol requirements or other requirements relating to request destinations and response addresses (e.g. a requirement that they must be the same). Accordingly, each port on a switch can be used to forward request PDU's to a number of different hosts accessible therefrom. In some embodiments, the response may originate from a host on a different port; in such cases, a receiving host may forward the request directly to a host that has is connected directly or indirectly to the switch via another port. The switch will use information stored in the request header to nevertheless determine the appropriate egress port for the response to be responsive to the corresponding request.

In embodiments, an incoming request is forwarded based on the destination address of the request (and possibly other information associated with the request, such as the source address, both referred to as the forwarding information), although in most cases the switch will not require a number of rules on a per-client or per-host because the forwarding rule will be based on a range or set of values or hashed values relating to the forwarding information. For example, a given hash function applied to the forwarding information (i.e the destination address, or the combination of the destination address and the other information) will result in a set of values some of which will be associated to a given port and/or host based on a single rule. In this way, the incoming requests use host-based (or in some cases client-based) forwarding rules, but a per-client rule is not required. Prior to forwarding, the request is modified, typically in the header, and typically by replacing the MAC destination address in some embodiments (although other information in the header or the request PDU can be modified or added in other embodiments). The modified information, in this embodiment, is the MAC destination address, which is modified by replacing the MAC destination address with information having embedded therein information relating to the ingress port of the request at the switch (often according to a port-indication convention). In such an embodiment, the request response corresponding to request, therefore, will have the source information comprising information embodied therein corresponding to the appropriate egress port of the request response. In this embodiment, the system then updates the source MAC address of the outgoing request response by changing it back to original destination MAC address of the incoming request. In some embodiments, the switch may use a forwarding rule associated with the port to forward the request response to the right port based on the embedded information in the source MAC address field (prior to changing it back to the original destination address of the corresponding incoming request. In such embodiments, where a forwarding rule is required to forward the request response based on the embedded information, a per-port rule is required, each of which can have a set of m clients associated therewith, where m is scalable without limit. In some embodiments, the embedded information may comprise either the rule or the port and thus no rules are required. In any case, the system does not require a per-client rule for forwarding request responses and, in some aspects, provides for scaling of client connections that are not limited by the number of forwarding rules available for request responses.

While the present disclosure describes various exemplary embodiments, the disclosure is not so limited. To the contrary, the disclosure is intended to cover various modifications and equivalent arrangements included within the general scope of the present disclosure.

We claim:

1. A distributed computing system comprising:
   a plurality of distributed computing hosts that process client requests from a computing client, said client requests comprising a request source address associated with the computing client and a request destination address corresponding to the distributing computing system, wherein request responses responsive to said client requests are returned to the computing client by one of said plurality of distributed computing hosts, said request responses having a response source address that is the same as the request destination address of the client request when received by the given distributed computing host and a response destination address that is the same as the client request source address of the client request when received by the given distributed computing host; and
   a programmable network switch, comprising two or more network ports for communicatively interfacing said plurality of distributed computing hosts and said computing client, said programmable network switch operable to forward client requests to a given network port based on forwarding rules related to the client source address;
   wherein the programmable network switch replaces the request destination address of a given client request with an incoming network port indicator that identifies on which network port a given client request is received; and
   wherein the programmable network switch forwards request responses corresponding to the given client request to the network port associated with the incoming network port indicator in the response source address and replaces the response source address with the original request destination address of the given client request.

2. The system of claim 1, wherein the request destination address is one of a MAC address and an IP address.

3. The system of claim 1, wherein the request source address is an IP address.

4. The system of claim 1, wherein the forwarding rules are stored in content-addressable memory (CAM) in the programmable network switch.

5. The system of claim 4, wherein the CAM is binary CAM.

6. The system of claim 4, wherein the CAM is ternary CAM (TCAM).

7. The system of claim 6, wherein forwarding rules associate wildcard values with corresponding values in the request source address.

8. The system of claim 1, wherein the distributed computing system is a data storage system.

9. The system of claim 8, wherein the client request is a read request and the request response contains data stored in said data storage system that is responsive to said request.

10. The system of claim 8, wherein the client request is a write request comprising data for storage in said data storage system and the request response contains a write confirmation.

11. The system of claim 10, wherein the write request is an update request.

12. The system of claim 8, wherein the client request is a delete request and the request response is a delete confirmation.

13. The system of claim 1, wherein each of the client request and the request response is transmitted as one or more protocol data units.

14. The system of claim 13, wherein the protocol data units are packets.

15. The system of claim 13, wherein the protocol data units are frames.

16. The system of claim 13, wherein the protocol data units are segments.

17. The system of claim 1, wherein the distributed computing system is a web server.

18. The system of claim 1, wherein the distributed computing system is a database.

19. The system of claim 1, wherein the distributed computing system is an email server.

20. A method of stateless network communication with a distributed computing system, the distributed computing system for processing client requests from a computing client, said client requests comprising a request source address associated with the computing client and a request destination address corresponding to the distributing computing system, wherein responses to said client requests are returned to the computing client by the distributed computing system, said responses having a response source address that is the same as the request destination address when the client request is processed and a response destination address that is the same as the client request source address when the client request is processed, the distributed computing system further comprising a programmable network switch for forwarding client requests based on forwarding rules related to the client source address, the method comprising the steps:

receiving a client request at the programmable network switch;

replacing the request destination address of a given client request with an incoming network port identifier corresponding to a network port on the programmable network switch on which the given client request arrived, the incoming network port being exposed to the computing client;

forwarding the given client request to a second network port exposed to distributed computing hosts, said second network port being identified by forwarding rules that depend on the request source address;

receiving a request response corresponding to the given client request at the programmable network switch;

determining the incoming network port identifier for the given client request corresponding to the request response using the response source address and then replacing the response source address with the request destination address from the corresponding given client request; and forwarding the request response to the network port corresponding to the network port identifier.

21. The method of claim 20, wherein the forwarding rules that identify the second network port include wildcard values associated with address values in the request source address.

22. The method of claim 20, wherein each of the client request and the request response is transmitted as one or more protocol data units.

23. The system of claim 22, wherein the protocol data units are selected from one of the following: packets, frames, and segments.

24. The method of claim 20, wherein the distributed computing system is a data storage system.

25. A programmable network switch for a distributed computing system, said switch comprising:

one or more client-associated network ports for receiving client requests from computing clients and forwarding request responses to said computing clients responsive to said client requests;

one or more host-associated network ports for forwarding client requests to distributed computing hosts and receiving request responses from said distributed computing hosts responsive to said client requests;

a forwarding plane memory comprising a plurality of forwarding rules that forward client requests to a given host-associated network port depending on information in said client requests;

wherein said client requests comprise a request source address associated with a computing client and a request destination address corresponding to the distributing computing system, and wherein request responses comprise a response source address that is the same as the request destination address of the client request when received by a given distributed computing host and a response destination address that is the same as the client request source address of the client request when received by the given distributed computing host; and wherein the programmable network switch replaces the request destination address in a given client request with an incoming network port indicator that identifies on which client-associated network port the given client request is received; and wherein the programmable network switch forwards a given request response corresponding to the given client request to the network port associated with the incoming network port indicator in the response source address of the given request response and replaces the response source address of the given request response with the original request destination address of the given client request.

26. The switch of claim 25, wherein the request source address is an IP address associated with a given computing client.

27. The switch of claim 25, wherein the request source address is a MAC address associated with a given computing client.

28. The switch of claim 25, wherein the client request comprises both a MAC address and an IP address.

29. The switch of claim 25, wherein the request destination address is an IP address associated with the distributed computing system.

30. The switch of claim 25, wherein the request destination address is the MAC address associated of the network switching device.

* * * * *